(No Model.)
G. HEFFNER.
NUT LOCK.
No. 361,515. Patented Apr. 19, 1887.
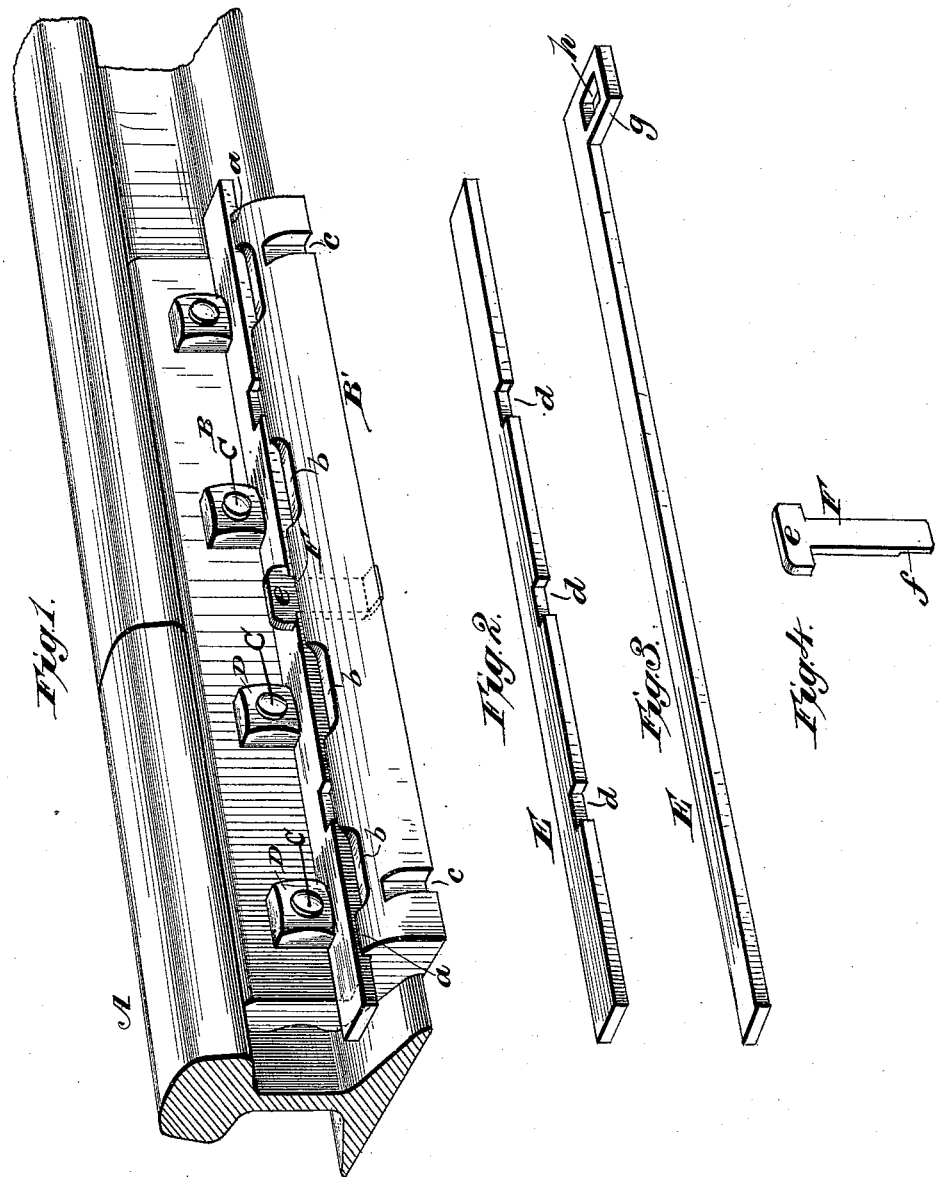
Witnesses,
Robert Emmett,
Victor Coombs.
Inventor,
George Heffner.
By James L. Norris,
Atty.

UNITED STATES PATENT OFFICE.

GEORGE HEFFNER, OF LOUISVILLE, KENTUCKY.

NUT-LOCK.

SPECIFICATION forming part of Letters Patent No. 361,515, dated April 19, 1887.

Application filed January 13, 1887. Serial No. 224,172. (No model.)

*To all whom it may concern:*

Be it known that I, GEORGE HEFFNER, a citizen of the United States, residing at Louisville, in the county of Jefferson and State of Kentucky, have invented new and useful Improvements in Nut-Locks, of which the following is a specification.

My invention relates to improvements in nut-locks; and it consists in certain peculiarities in the construction and combination of a fish-plate and a nut-locking bar for railroad-rails, as hereinafter more fully set forth.

In the annexed drawings, illustrating the invention, Figure 1 is a perspective view of my improved nut-locking devices applied to two abutting railroad-rails. Fig. 2 is a perspective view of a nut-locking bar detached. Fig. 3 is a similar view of a modified form of nut-locking bar. Fig. 4 represents a key for holding the nut-locking bar in place.

Referring to the drawings, the letter A designates portions of two railroad-rails with their ends abutting, and B is a fish-plate, having a base-flange, B', that overlaps the rail-foot. The screw-bolts C are passed through the rails and fish-plate, as usual, and are secured by nuts D, in the ordinary manner.

Along the upper surface of the fish-plate flange B' is formed a longitudinal rib or shoulder, $a$, which is broken at intervals by notches or recesses $b$, of sufficient width to afford space for conveniently using a wrench to tighten or loosen the nuts. In the outer edge of the fish-plate flange B' are notches or recesses $c$, for passage of the spikes that secure the rails to the ties.

The rib or shoulder $a$, that extends longitudinally along the upper surface of the fish-plate flange, forms a groove or channel beneath the nuts for the reception of a locking-bar, E, to prevent the nuts from turning or working loose. This nut-locking bar E consists of a flat strip of metal a little longer than the fish-plate and of sufficient width and thickness to fit closely in the groove or channel formed by the rib $a$ and press against the under edges of the nuts, thereby preventing them from turning on the screw-bolts. The nut-locking bar E is driven into place behind the rib or shoulder $a$ from one end of the fish-plate after the nuts have been screwed onto the bolts.

In order to prevent the nut-locking bar E from being displaced, I may secure it by means of a key, F, driven into one of a series of notches, $d$, formed in the outer edge of said bar, as shown in Figs. 1 and 2, and through a corresponding opening in the fish-plate base-flange. The key F is preferably made T-shaped, as shown in Fig. 4, its head $e$ being adapted to rest on the upper surface of the locking-bar. The lower end of the key F is formed with a rabbet, $f$, or reduced in thickness, to enable it to be readily bent at a right angle beneath the base-flange B' of the fish-plate after it has been driven into position, as shown by dotted lines in Fig. 1. This key can be made of tough pliable metal, to enable its lower rabbeted end to be easily bent beneath the fish-plate and to be straightened again when its withdrawal is required.

Instead of securing the nut-locking bar E in the manner above described, I may provide it at one end with an offset, $g$, having an eye, $h$, as shown in Fig. 3, for passage of a spike or bolt to fasten it to one of the ties.

I am aware that a railroad-rail joint has heretofore comprised a fish-plate having a base-flange on which rests a locking bar or plate arranged beneath the nuts to hold them from turning, said locking bar or plate being held in place by the same spikes that secure the rails and fish-plate to the road-bed, as shown, for instance, in Patents No. 29,235, to Bayley, July 24, 1860, and No. 275,188, to Getz, April 3, 1883. In such nut-locks for rail-joints the fish-plate base-flange is sometimes provided along its outer side with an upwardly-projecting rim, forming a groove beneath the nuts for reception of the locking-bar, as shown in Patent No. 197,606, to Callman, November 27, 1877. I am also aware that in a compound rail composed of inner and outer sections a plate having a recessed upper edge has been secured beneath the nuts by means of a spike driven from the outside, as shown in Reissue Patent No. 5,308, to McKenney, March 4, 1873. In addition to the ordinary spike-fastening, the locking-bar has sometimes been provided on each side of a sleeper with perforated lugs to receive keys for preventing end movement of the bar, as shown in Patent No. 159,706, to Noonan, February 9, 1875. My invention differs from each of those above referred to in comprising a fish-plate having a base-flange provided with a shoulder which is broken at intervals by notches or recesses to afford space for turning the nuts, a straight and flat locking-bar located behind said shoulder and beneath said nuts, and an independent fastening consisting of a headed key engaged in a recess, notch, or open slot formed in the outer lateral edge of said locking-bar, the key being passed down through an opening in the base-flange of the fish-plate and secured by bending its end beneath said fish-plate. The nut-locking bar E is thus secured by means independent of the spike-fastenings that hold the rails and fish-plate in position, thereby imparting additional strength and security to the rail-joint, and enabling the nuts and bolts to be readily adjusted whenever required.

What I claim as my invention is—

The combination of the rails A, the fish-plate B, having a base-flange, B', provided with a shoulder, a, in which are formed recesses b, that coincide with the position of the bolts and nuts, the bolts C and nuts D, located above said recesses, a flat straight locking-bar, E, having recesses d in its outer lateral edge, said bar being located behind the shoulder a and immediately beneath the nuts, and an independent fastening consisting of the key F, engaged in one of the recesses d and passed down through the base-flange of the fish-plate, with its lower end bent over beneath said fish-plate, substantially as described.

In testimony whereof I affix my signature in presence of two witnesses.

GEORGE HEFFNER.

Witnesses:
JAMES L. NORRIS,
J. A. RUTHERFORD.